No. 666,420. Patented Jan. 22, 1901.
L. HEATH.
WHEEL BEARING FOR AGRICULTURAL MACHINERY.
(Application filed July 28, 1900.)
(No Model.)
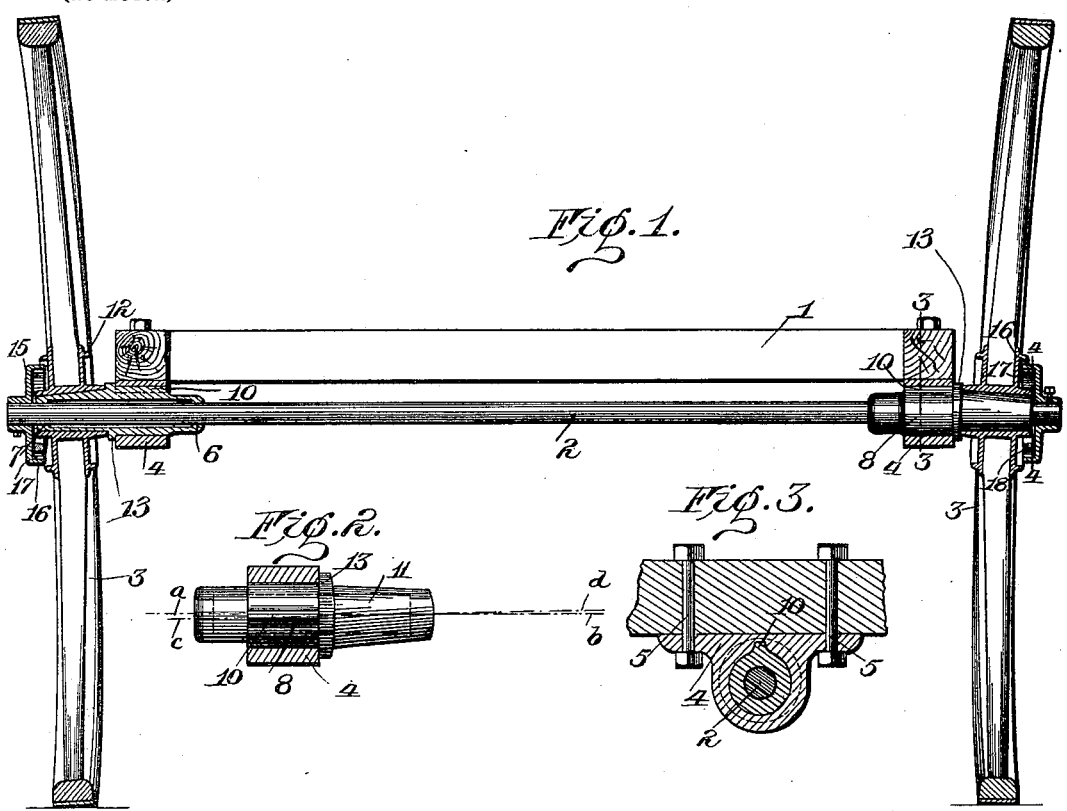
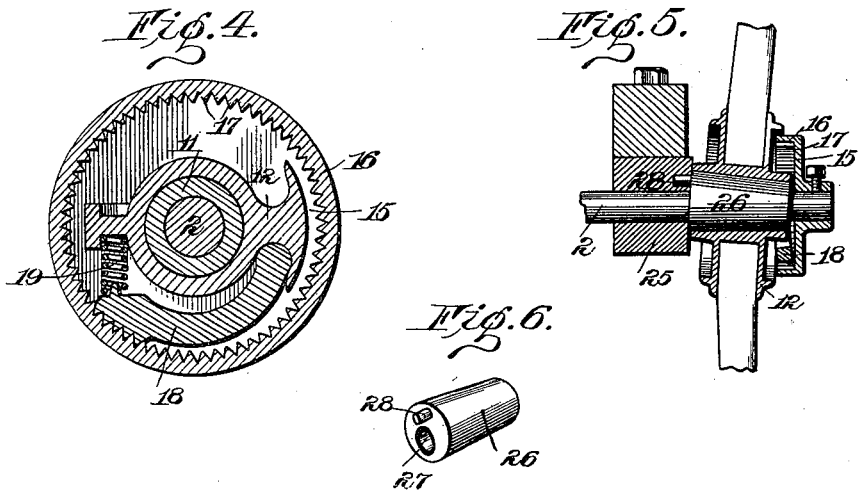
Witnesses:
Thomas Durant
Elizabeth Griffith
Inventor:
Lawrence Heath
by Church & Church
his Attorneys.
THE NORRIS PETERS CO., PHOTO-LITHO., WASHINGTON, D. C.

UNITED STATES PATENT OFFICE.

LAWRENCE HEATH, OF MACEDON, NEW YORK, ASSIGNOR OF ONE-HALF TO ALEXANDER P. BRENNEN, OF SAME PLACE.

WHEEL-BEARING FOR AGRICULTURAL MACHINERY.

SPECIFICATION forming part of Letters Patent No. 666,420, dated January 22, 1901.

Application filed July 28, 1900. Serial No. 25,188. (No model.)

*To all whom it may concern:*

Be it known that I, LAWRENCE HEATH, of Macedon, in the county of Wayne and State of New York, have invented certain new and useful Improvements in Wheel-Bearings for Agricultural Machinery; and I do hereby declare the following to be a full, clear, and exact description of the same, reference being had to the accompanying drawings, forming a part of this specification, and to the reference-numerals marked thereon.

My present invention has for one object to provide an improved bearing for supporting the frames or carriages of agricultural machinery and particularly of grain-drills in their supporting-wheels in such a manner that the latter may be given the necessary pitch outward to cause the spokes as they rotate beneath the bearing to assume a vertical position and also to provide a slight gather or angular inclination to the axis in the line of movement of the vehicle which will give the wheels a tendency to move inwardly on their bearings as they rotate thereon.

A further object is to provide a structure which is capable of being applied to machines already in use and which will not be affected to change the position of the wheels by the loading of the machine and the springing of the frame.

To these and other ends the invention consists in certain improvements in construction and combinations of parts, all as will be hereinafter fully described, the novel features being pointed out in the claims at the end of this specification.

In the drawings, Figure 1 is a sectional view showing the frame of a machine embodying my invention; Fig. 2, a top plan view of my bearing; Fig. 3, a sectional view on the line 3 3 of Fig. 1; Fig. 4, a sectional view on the line 4 4 of Fig. 1, showing the ratchet connection between the wheels and driving-shaft; Fig. 5, a view, partly in section, showing a modified form of my device; and Fig. 6, a perspective view of a part thereof.

Similar reference-numerals indicate similar parts.

In illustrating my device I have shown it applied to the usual form of grain-drill having the frame 1, 2 indicating the shaft or axle, extending between the wheels 3 and adapted to be revolved thereby continuously in one direction to operate the seeding devices or other mechanism, which it is unnecessary to show in the present case. Mounted upon the sides of the frame 1 are hangers or carriers 4, secured by bolts 5 and supporting the wheel and shaft bearing, as will be described. The bearing is constructed in the form of a sleeve having an aperture through which the shaft 2 extends, and the short bearings 6 and 7 upon each end, in which the latter is supported. The central portion 8 of the sleeve engages loosely in the hanger 4 and is prevented from rotation therein by a key or lug 10, engaging a recess in the hanger. The outer end 11 of the sleeve is tapered to fit the corresponding aperture in the hub 12 of the wheel. The wheels 3 are of the usual dished form, and the tapered bearing portion 11 of each sleeve is arranged with its central axis at an angle to that of the shaft 2, inclining the wheel outward sufficiently to bring the lower spokes into a perpendicular position as they revolve beneath the bearing, and said central axis of the sleeve is also inclined at a slight angle forward of the axis of the shaft, causing the forward edge of the wheel to be thrown inwardly slightly, as shown by the axial lines $a\ b$ and $c\ d$, Fig. 2, the former indicating the plane of the axle and the latter that of the sleeve, whereby as they revolve in contact with the ground they will have a tendency to crowd toward the center and relieve the ratchet-caps of unnecessary strain by preventing the wheels from slipping outward upon their bearings. The sleeve is prevented from moving inwardly in the hanger by means of a collar 13, engaging the outer end of the latter, and the collar also forms an abutment limiting the inward movement of the wheel.

The rotary movement of the wheels is imparted to the shaft 2 by means of a loose connection, preferably embodying a ratchet, of which any desired form may be employed, and in the present instance I have shown a cap 15 secured rigidly to the end of the shaft, having the rim 16, upon the interior of which are ratchet-teeth 17, with which coöperates a pawl 18, secured to the wheel-hub 12 and held in engagement with the teeth 17 by a spring 19. This arrangement insures the rotation of the shaft only when the wheels are revolved forward and permits the latter to be moved freely in the opposite direction.

By forming the bearing for the wheels of separate pieces and supporting each sleeve on the bearings 6 and 7 at its extremities on the shaft 2 the latter is allowed to revolve freely, and the loose connections between the sleeves and the hangers permit the frame 1 to spring or give as the load is applied without affecting the position or operation of the wheels. This construction is also particularly advantageous in setting up a machine, as the sleeves may be slipped into the hangers and applied to the shaft and the hangers secured to the frame, insuring the perfect alinement of the shaft and wheels under all conditions.

In Figs. 5 and 6 I have shown a modification of my structure which may be applied to machines of the class described in which the body or frame is supported upon the shaft by a separate bearing, as 25. The device consists of a separate bearing portion or block 26, adapted to fit the wheel-hub and provided with the aperture 27, through which the end of the shaft may project, said aperture being formed at such an angle to the central line of the bearing-block as to give the necessary pitch and gather to the wheel. The block may be slipped upon the shaft and held stationary relative to the frame by any simple device, such as a pin 28, engaging an aperture provided in the side of the bearing 25, against which it abuts.

Bearings such as I have described are simple and easily constructed, and the parts being interchangeable they may be readily replaced in case of wear.

I claim as my invention—

1. In a vehicle, the combination with a frame, having hangers thereon and the bearings supported loosely in the hangers, of the wheels mounted on the bearings, and connections between the latter.

2. In a vehicle, the combination with a frame having hangers thereon, and the bearings loosely supported in the latter, of the wheels mounted on the bearings, and connections between the latter whereby they are held in alinement independently of the frame.

3. In a vehicle, the combination with a frame, wheels supporting the latter and a rotary shaft adapted to be operated by said wheels, of sleeves supported in the wheels, bearings in the sleeves for the shaft, and loose connections between the bearings and the vehicle-frame.

4. In a vehicle, the combination with a frame, wheels for supporting the latter, and a rotary shaft adapted to be operated by the wheels, of the tubular bearings for the wheels forming bearings for the shaft, and loose connections between the said bearings and the frame.

5. In a vehicle, the combination with a frame, wheels for supporting the latter, and the rotary shaft adapted to be operated by the wheels, of the sleeves supported in the wheels, and having the bearings for the shaft, and the loose supports for the sleeves engaging the latter intermediate the ends of the shaft-bearings.

6. In a vehicle, the combination with a frame having the hangers thereon, the sleeves loosely supported in the hangers, and the shaft extending through the sleeves, of the bearings formed upon the ends of the sleeves, and the wheels mounted thereon.

7. In an agricultural implement having a rotary shaft, the combination with a frame, a hanger thereon, a sleeve loosely supported in the hanger having a bearing upon one end, and the wheel operating thereon, of the bearing within the sleeve supporting one end of the shaft and extending upon opposite sides of the hanger, and connections between the wheels and shaft for causing the operation of the latter.

8. In an agricultural implement having a rotary driving-shaft, the combination with a frame having the hangers thereon, the sleeves loosely supported in the hangers and prevented from rotation therein, having the bearings upon the ends on which the wheels are supported, and the shaft-bearing in the sleeves, the wheels, and driving connections between the wheels and shaft.

9. In an agricultural implement, the combination with a frame having the hangers thereon, the sleeves loosely mounted in the latter and held from rotation therein and having the bearings, and the shaft supported therein, of the bearings formed upon the ends of the sleeves having their axial lines diverging from that of the shaft, the wheels supported on said bearings, and connecting devices between the wheels and the shaft, whereby the latter will be revolved in one direction only.

10. The combination with the frame, and the sleeve loosely supported thereon, having the aperture, the axle extending through the latter, and the exterior bearing portion extending at an angle to the axle, of a wheel revolubly mounted on the sleeve and connected to the axle.

11. The combination with the frame, and the sleeve loosely supported thereon, having the aperture, the axle extending through the latter, and the tapered exterior bearing portion arranged upon one end and extending at an angle thereto, of the wheel revolubly mounted on said bearing and connected to the axle.

12. The combination with the frame, and the sleeve loosely supported thereon having the aperture, the axle extending through the latter and the tapered exterior bearing upon one end of the sleeve arranged at an angle to the axle and extending in vertical and horizontal planes thereto to tip the wheel outwardly from a vertical line and inwardly, at its forward edge, from a horizontal line, of a wheel revolubly mounted on said bearing.

LAWRENCE HEATH.

Witnesses:
 CHARLES E. FULLER,
 RAYMOND HENDRICKSON.